Dec. 6, 1960             C. M. GOLD ET AL             2,963,533

SHOCK-NEUTRALIZING MEANS FOR LIQUID-TRANSFER DEVICES

Filed April 16, 1958                                          2 Sheets-Sheet 1

INVENTORS:
CHARLES M. GOLD
LEON KARDORFF
BY
AGENT

United States Patent Office 2,963,533
Patented Dec. 6, 1960

2,963,533

SHOCK-NEUTRALIZING MEANS FOR LIQUID-TRANSFER DEVICES

Charles M. Gold, Franklin Square, and Leon Kardorff, Jamaica, N.Y., assignors to Yardney International Corp., New York, N.Y., a corporation of New York Filed Apr. 16, 1958, Ser. No. 728,934

3 Claims. (Cl. 136—90)

This invention relates to a liquid-transfer system adapted for use in electric batteries and other liquid-containing devices, and more particularly to automatic battery activators.

Liquid-transfer devices, particularly for deferred-action batteries, have been noticeably deficient in meeting present-day handling requirements. Shocks such as those caused by dropping or nearby detonation of bombs, as well as strong vibrations, e.g. from reaction motors, create hydro-kinetic waves in the stored liquid that may initiate activation. These shock waves have sufficient impact to rupture the frangible disc which controls the activation of the battery.

An object of this invention is to provide a liquid-transfer system with means for harmlessly absorbing hydro-kinetic shocks.

Another object of this invention is the provision of a liquid-transfer device inherently protected against premature operation but adopted to respond more dependably and quickly than known devices to the operation of its activator.

A more particular object of the present invention is the provision of a protective shield for a frangible diaphragm forming part of a liquid-transfer device as disclosed in co-pending application Ser. No. 416,468, filed March 16, 1954, by Emanuel Cooper and Charles M. Gold.

A further object of this invention is to provide means for preventing obstruction of the fluid-carrying channels by an inflatable bladder, serving as a means for exerting pressure upon the electrolyte or other liquid during activation of the system, while simultaneously protecting the bladder itself from contact with the diaphragm-puncturing device.

The foregoing objects are realized, in accordance with this invention, by the provision of a device constructed of a shock-resistant material forming a circuitous passageway for a liquid, this device constituting a shield capable of neutralizing or deflecting shock waves occurring within the liquid. This prevents premature rupture of the frangible or other pressure-sensitive seal controlling the activation of the associated fluid-receiving system, such as a dry-charged battery.

The above and further objects, features and advantages will be apparent from the following detailed description of various embodiments, reference being made to the accompanying drawings in which.

Figure 1:
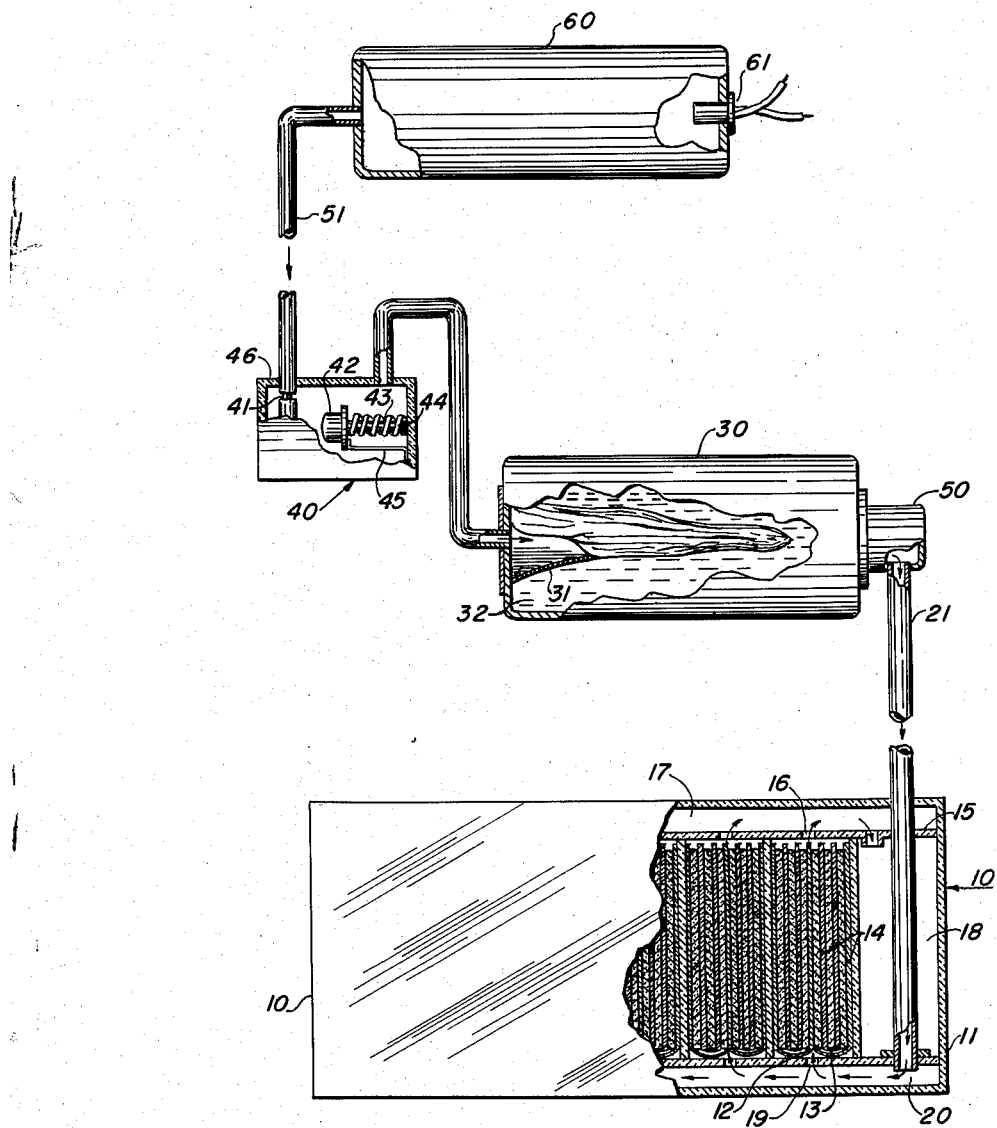
Fig. 1 is a cutaway view of the principal parts of a deferred-action battery incorporating an activating system according to the invention.

In Fig. 1 the battery 10 is shown schematically to comprise a casing 11 containing a series of cells 22 each including positive plates 12, negative plates 13 and interposed interelectrode separators 14; the electrodes 12 and 13 are connected to positive and negative terminals (not shown) in the usual manner. Special vents 16 are provided in the cover plate 15 of the battery to allow surplus gas, vapor and electrolyte to escape through the manifold 17 into a sump 18. A conduit 21 connects the liquid-transfer changer 50 with the distributing plate 20. Feed channels 19 in the lower part of casing 10 provide an inlet from the distributing plate 20 to each of the individual cells 22.

A cylindrical container 30, constituting a storage chamber for a liquid electrolyte 32 (e.g. a concentrated solution of potassium hydroxide) is connected to the battery 10 by way of chamber 50 and conduit 21. The container 30 has been shown as a separate device but may also be cemented upon the battery casing 11 to form one unit. The container 30 encloses an inflatable bladder 31, made of polyethylene or equivalent flexible material, which serves as a piston adapted to exert pressure upon the fluid 32. One end of the container 30 is connected to a trigger mechanism 40 which again, for purposes of illustration, has been shown as located in a separate housing 46 but in practice may be positioned in an ante-chamber of this cylinder.

The trigger mechanism 40 comprises a weight 42 slidably mounted on a rod 43 under pressure of a spring 44 and restrained from sliding by detent means responsive to an activation signal such as a fusible link 45 which can be ruptured by the passage of an electric current therethrough as described in the above-identified Cooper-Gold application. The circuit for the activating current may be closed by a manually or automatically operated switch (not shown).

A receptacle 60, containing an inert gas under relatively high pressure, is provided with a nozzle 51 entering the trigger housing 46. This nozzle terminates within housing 46 in a blind tube 41 adapted to be broken off by the weight 42 upon fusion of the link 45. A gas-pressure indicator 61 is provided on the receptacle 60.

Figure 2:
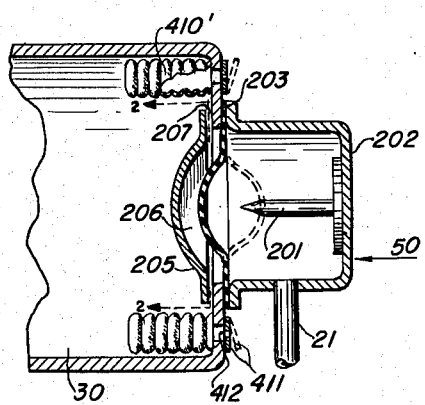
Fig. 2 is a sectional view of a shielded seal forming part of the system shown in Fig. 1.
Figure 3:
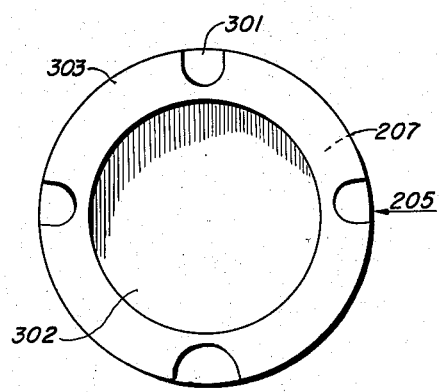
Fig. 3 is a face view of the shield of Fig. 2, taken on line 2—2 thereof.

The liquid-transfer chamber 50, as seen in Fig. 2 comprises a puncturing device 201 affixed to the chamber wall 202. A frangible sealing diaphragm 203 originally closes the passageway between the electrolyte chamber 30 and the conduit 21.

A shield 205, made of a material sufficiently rigid to deflect hydro-kinetic shock waves occurring within the electrolyte 32, is seated against the inner wall of the cylinder 30 by means of angularly spaced supports 301. The shield 205 has a central bulge 302 curved toward the interior of container 30. The bulge 302 is surrounded by a flat rim 303 spaced from the cylinder wall by a small thickness equaling the height of the supports 301. This forms a narrow clearance providing a circuitous path of limited width for the flow of the liquid 32 from container 30 to chamber 50 while the convex portion 302 of the shield breaks or deflects any shock wave propagated in the liquid.

In the operation of the automatic battery-activator system shown in Fig. 1, the battery 10 may assume any position, including an inverted position, dependent upon the mode of use; thus, the system can be utilized on the ground or in some vehicle or carrier traveling through water, air or free space.

When the trigger mechanism 40 is operated by the inactivation of the detent 45, the breaking of the seal 41 allows the gas from high-pressure receptacle 60 to enter the housing 46 and to pass into the inflatable bladder 31 contained within the cylinder 30. The gas inflates the bladder 31 and exerts pressure upon the stored liquid 32. The resulting forward surge of the liquid is deflected around the circumference of the shield 205 and its flow is directed through the narrow passageways 207 between the posts 301 into the interspace 206 between the shield and the diaphragm 203. These passageways have a combined cross-sectional area substantially equaling or exceeding somewhat the cross-sectional area of the outlet 21, in a practical embodiment, the diameter of shield 205 was 65 mm., the spacing of its rim 303 from diaphragm 203 was 0.25 mm. and the inner diameter of conduit 21 was 8 mm., the entrance area at 207 (even when considering the obstruction represented by the narrow posts 301) being thus of the same order as the outflow area at 21.

The shield 205 has the added function of preventing the inflated bladder 31 from coming into contact with the spike 201 while also avoiding any obstruction of the passageways 207 by this bladder. This insures activation of the battery within a short period of time, e.g. an interval of the order of 10 seconds or less.

As the electrolyte, under pressure, is forced against the frangible sealing disk 203, it causes instantaneous inversion of the curvature of this disk as illustrated in Fig. 2 in dotted lines. The disk 203 is thereby forced against the spike 204 which penetrates its curved central portion and causes its rupture. The resulting breach is immediately enlarged by the onflow of the liquid, under pressure, as it passes toward the conduit 21. The electrolyte 32 then enters the cells 22 of the battery 10, by means of the feed channels 19 extending from the distributing plate 20, thus causing activation of the battery.

Figure 4:
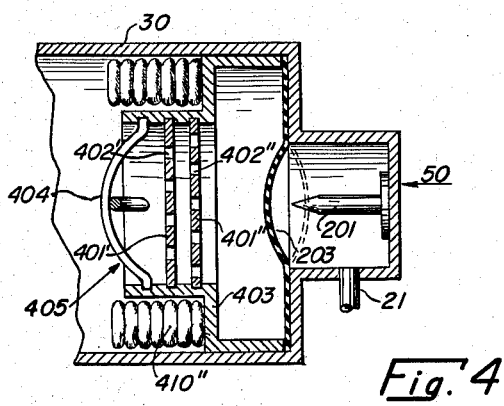
Fig. 4 is a cross-sectional view of a modified shield according to this invention.

Fig. 4 shows a modified shield 405 which comprises a series of plates 401', 401", two of which are shown, having apertures 402', 402" in staggered relation so that any shock waves passing through the apertures 402' of the first plate 401' would have frontal contact 401" with and be deflected by the solid portion between the apertures 402" of the second plate 401". Any reasonable number of such plates may be inserted in a frame 403 which is press-fitted or otherwise recessed within the cylinder 30 forwardly of chamber 50. Again, the total cross-sectional area represented by the apertures 402', 401" of either disk should be of the order of the cross-sectional area of outlet 21. A bail 404, extending across the frame 403 forwardly of the plates 401', 401", serves to deflect the inflated bladder 31 from these apertures so as to prevent a blocking of the passageways therethrough. The hydrokinetic-shock neutralizer of this invention need not be a reflector but may operate on the principle of absorption and dissipation. A neutralizer of this type has been illustrated in Figs. 2 and 4 as comprising a series of bellows 410', 410" positioned inside the container 30. The bellows 410', 410", made of a material which offers greater resilience than that of the seal 203, may contain air or some other gas and may be open toward the atmosphere as in Fig. 2 or closed as in Fig. 4. In the former case they may be provided with preferably spring-loaded, normally closed valve flaps 411 having orifices 412 to slow down the re-expansion of the bellows, in the manner of a dashpot, after the shock wave has passed. The absorbing shock neutralizer 410', 410" can be used alone or in conjunction with a reflecting neutralizer such as those shown at 205 and 401, 402.

The invention is, of course, not limited to the specific embodiments described and illustrated but is susceptible of numerous modifications without departing from the spirit and scope of the appended claims. Examples of such modifications include use of other types of trigger mechanisms such as detonating devices or mechanically released detents. The transferring gas need not be derived from a storage container but may also be generated in situ et tempore by chemical means including slow-burning electrical squibs. Moreover the inflatable bag may be replaced by a flexible bellows or diaphragm or even by a free piston having a good leak-proof seal such as may be provided by O rings.

We claim:

1. In a liquid-transfer device, in combination, a container, a fluid in said container, said container being provided with an outlet for said fluid, seal means blocking said outlet, said seal means being inactivable in response to greater-than-normal pressure of said fluid, control means operable to exert upon said fluid a pressure sufficient to inactivate said seal means, and a shock-neutralizing, resilient bellows in said container.

2. The combination according to claim 1, wherein the interior of said bellows communicates with the atmosphere outside said container.

3. The combination according to claim 1, further comprising a substantially rigid shield positioned in front of said seal means.

References Cited in the file of this patent

UNITED STATES PATENTS

| | | |
|---|---|---|
| 2,529,511 | Murphy | Nov. 14, 1950 |
| 2,682,567 | Porter | June 29, 1954 |

FOREIGN PATENTS

| | | |
|---|---|---|
| 1,126,430 | France | Nov. 22, 1956 |